United States Patent [19]

Gailbreath et al.

[11] Patent Number: 4,970,621
[45] Date of Patent: Nov. 13, 1990

[54] DEMAGNETIZATION OF THIN FILM MAGNETIC RECORDING TRANSDUCERS UTILIZING A DECREASING AC CURRENT

[75] Inventors: Samuel H. Gailbreath; Ralph F. Simmons, both of Boise, Id.

[73] Assignee: Hewlett-Packard Company, Palo Alto, Calif.

[21] Appl. No.: 267,144

[22] Filed: Sep. 9, 1988

[51] Int. Cl.$^5$ .................... G11B 5/465; H01F 13/00
[52] U.S. Cl. .................................. 361/149; 361/267; 360/66
[58] Field of Search ............... 361/149, 150, 151, 154, 361/155, 267; 307/104, 264; 360/46, 66, 67, 110, 111, 112, 113

[56] References Cited

U.S. PATENT DOCUMENTS

| | | | |
|---|---|---|---|
| 3,887,945 | 6/1975 | Nepela et al. | 360/113 |
| 4,471,403 | 9/1984 | Dress, Jr. et al. | 361/149 |
| 4,821,127 | 4/1989 | Soga et al. | 360/66 |

Primary Examiner—A. D. Pellinen
Assistant Examiner—David Osborn

[57] ABSTRACT

Noise in the readback signal of a magnetic recording device resulting from spurious pulses in the readback signal produced by transitions of the magnetic remanent state of the yoke in the read/write transducer is eliminated by controlling the occurrence of the spurious pulses. Immediately following the completion of the write process, a decreasing amplitude alternating current is applied to the read/write coil of the transducer to drive the yoke remanent state to a stable or zero remanent state prior to the commencement of the read process.

8 Claims, 5 Drawing Sheets

4,970,621

DEMAGNETIZATION OF THIN FILM MAGNETIC RECORDING TRANSDUCERS UTILIZING A DECREASING AC CURRENT

BACKGROUND OF THE INVENTION

The present invention relates generally to the magnetic recording of data utilizing thin film transducers and, more particularly to the demagnetization of the yoke in a magnetic recording transducer utilizing a decreasing AC current applied to the write element for a short period of time after the completion of the write cycle.

It is well known that many magnetic recording products take advantage of the improved frequency response and read/write efficiencies provided by thin film ferromagnetic recording transducers. The magnetic elements of the transducer are fabricated from magnetic material deposited in a continuous ferromagnetic film having magnetic remanent states determined by various configurations of the magnetic domains. The transducer magnetic domain configuration is in part determined by the anisotropic characteristics of the transducer yoke material. These anisotropies include effects due to the yoke shape, the material crystalline structure and magnetostriction. The geometric shape of the transducer yokes affects the magnetic domain configuration through the magnetic domain nucleation sites caused by corners and edges or defects in the magnetic material forming the yokes. The stability of the magnetic domain configuration which remains after the write process has saturated the yokes is in part determined by the coercivity of the yoke material and by thermal effects due to resistive heating during writing.

A common problem accompanying the use of thin film magnetic transducers is the occurrence of spurious pulses during data readback immediately following the write process. This problem has been variously termed "popcorn noise", "after-write-drop-in" and "glitch-after-write". These spurious pulses are caused by the decay or relaxation of a metastable non-zero magnetic remanent state to a stable magnetic remanent state which induces a signal in the transducer read/write coil. The relaxation or decay to zero remanence may be initiated by temperature changes in the head or by external stray magnetic fields in the vicinity of the transducer. If the relaxation is not controlled, the pulse may occur during normal reading of data after a write operation. The time of decay or relaxation may be as short as a microsecond or as long as fifty microseconds or more after the completion of a write operation. In order to read back data within a few microseconds of the completion of a write operation, the occurrence of these spurious pulses must be minimized or eliminated.

SUMMARY OF THE INVENTION

The present invention discloses a method for controllably returning the magnetic transducer to a zero magnetic remanent state within a couple of microseconds of the completion of the write process. At the completion of the write process the magnetic transducer is demagnetized or degaussed by applying an AC current to the write head while monotonically decreasing the current from a value equal to the nominal write current to a lesser value, typically near or equal to zero. This AC demagnetization current drives the magnetic transducer to a zero remanent state prior to the commencement of a read cycle thus eliminating the possibility of the occurrence of a spurious pulse during the data read back process.

DETAILED DESCRIPTION OF THE PREFERRED EMBODIMENT

Figure 2:
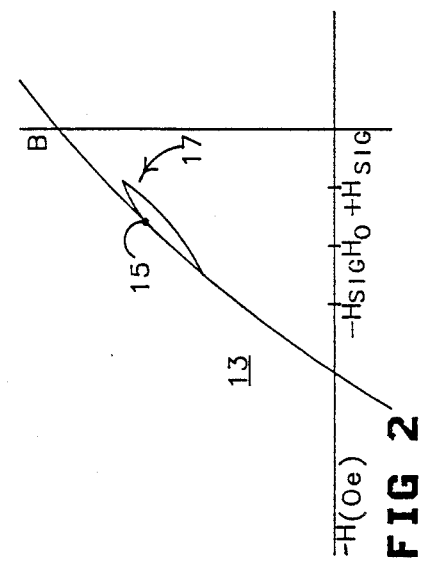
FIG. 2 is a diagram of the second quadrant of the hysteresis loop shown in FIG. 1 showing the operating point of a typical magnetic transducer.
Figure 1:
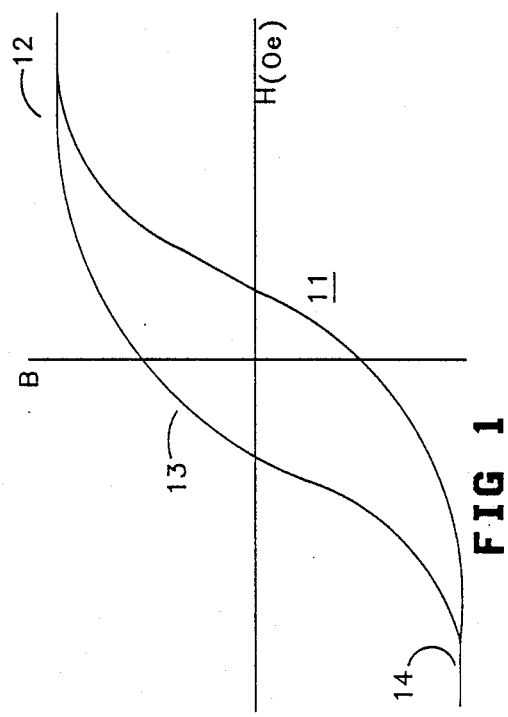
FIG. 1 is a diagram illustrating a typical B-H hysteresis for a ferromagnetic material.

Referring now to FIGS. 1-4, FIG. 1 is a diagram illustrating a B-H curve or hysteresis loop 11 for a typical ferromagnetic material used in magnetic recording transducers. During the data write process, a pulsed current signal (waveform 63 shown in FIG. 7, for example) is applied to the transducer read/write coil which causes the magnetic field induced in the transducer yoke material to be cycled around the hysteresis loop 11. For a typical application of thin film magnetic transducers, at least some portion of the transducer material is cycled around the hysteresis loop from a positive saturation region 12 to a negative saturation region 14. When the write current is abruptly reduced to zero at the conclusion of the write process, the state of the magnetic material is typically somewhere in the second quadrant 13 of the B-H curve. The value of the flux density, B, and the magnetizing force, H, at the operating point 15 is determined by the magnetic properties of the material and the geometric shape of the transducer yokes.

If during the data readback process the state of the magnetic material is stable at the operating point 15, the magnetization of the material remains in the vicinity of the operating point 15. Even when the remanent state is stable at the operating point 15, there may be minor distortions in the data readback due to variations in the value of the B-H curve as shown by curve 17. If the remanent state of the material is not stable at the operating point 15, then small perturbations may cause the magnetization state to change from one point to another inducing a pulse in the transducer read/write coil.

Figure 3:
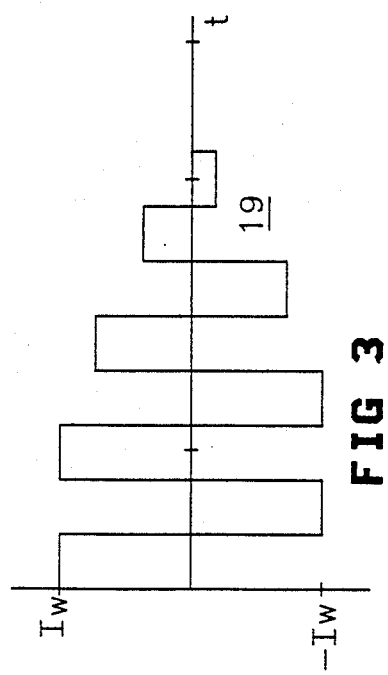
FIG. 3 is a waveform representing the decreasing AC demagnetization current of the present invention.
Figure 4:
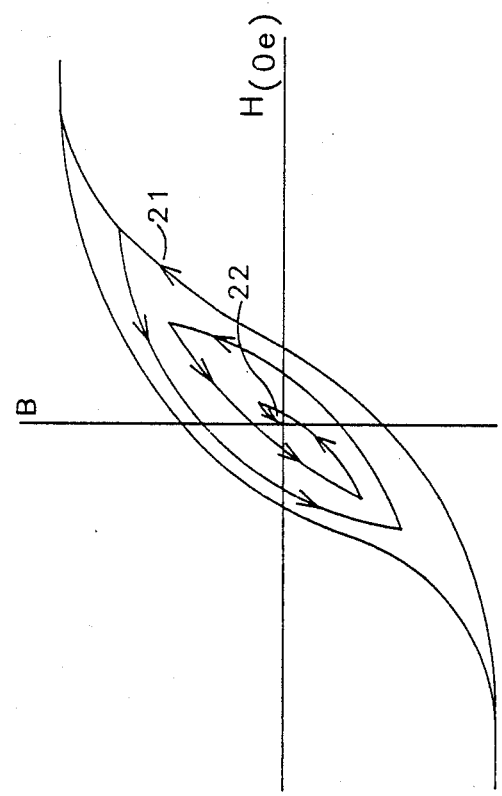
FIG. 4 is a diagram illustrating the resulting trajectory of the B-H for a ferromagnetic material when shown in FIG. 3 is applied.

The magnetic material of the yoke may be controllably driven to the zero remanent state 22 as shown in FIG. 4, curve 21, by applying a decreasing AC current signal as shown by the waveform 19 in FIG. 3. The decreasing, alternating current is sufficient to stimulate the transition from a metastable state to a stable state and hence eliminates the possibility of a pulse occurring later the data readback cycle.

Figure 5:
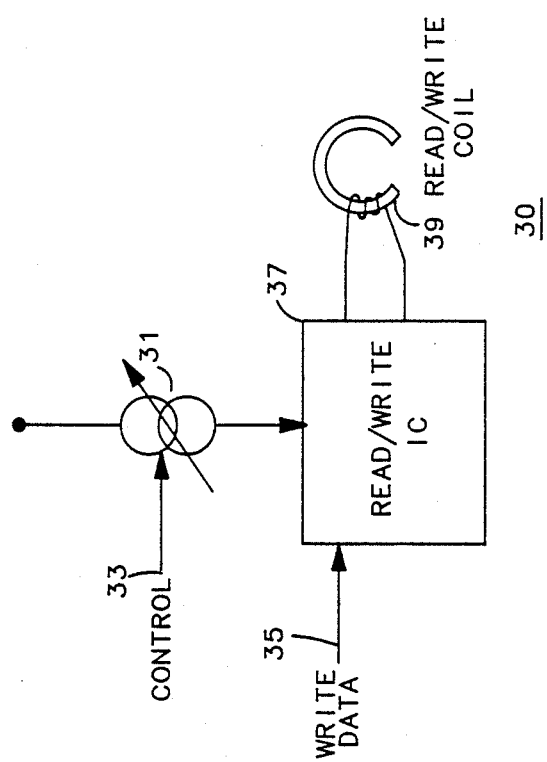
FIG. 5 is a block diagram of a circuit implementing the principles of the present invention.
Figure 6:
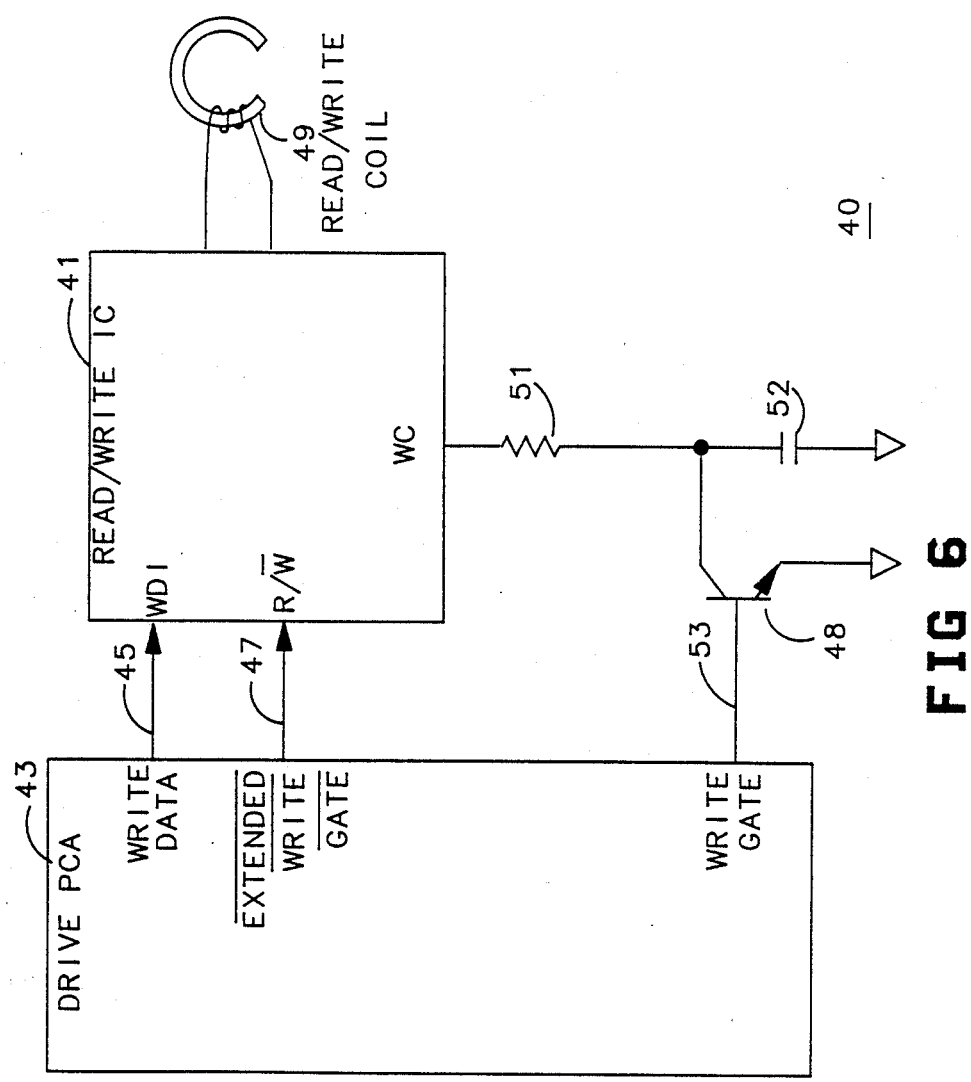
FIG. 6 is a block diagram of the read/write circuitry of the preferred embodiment according to the principles of the present invention.
Figure 7:
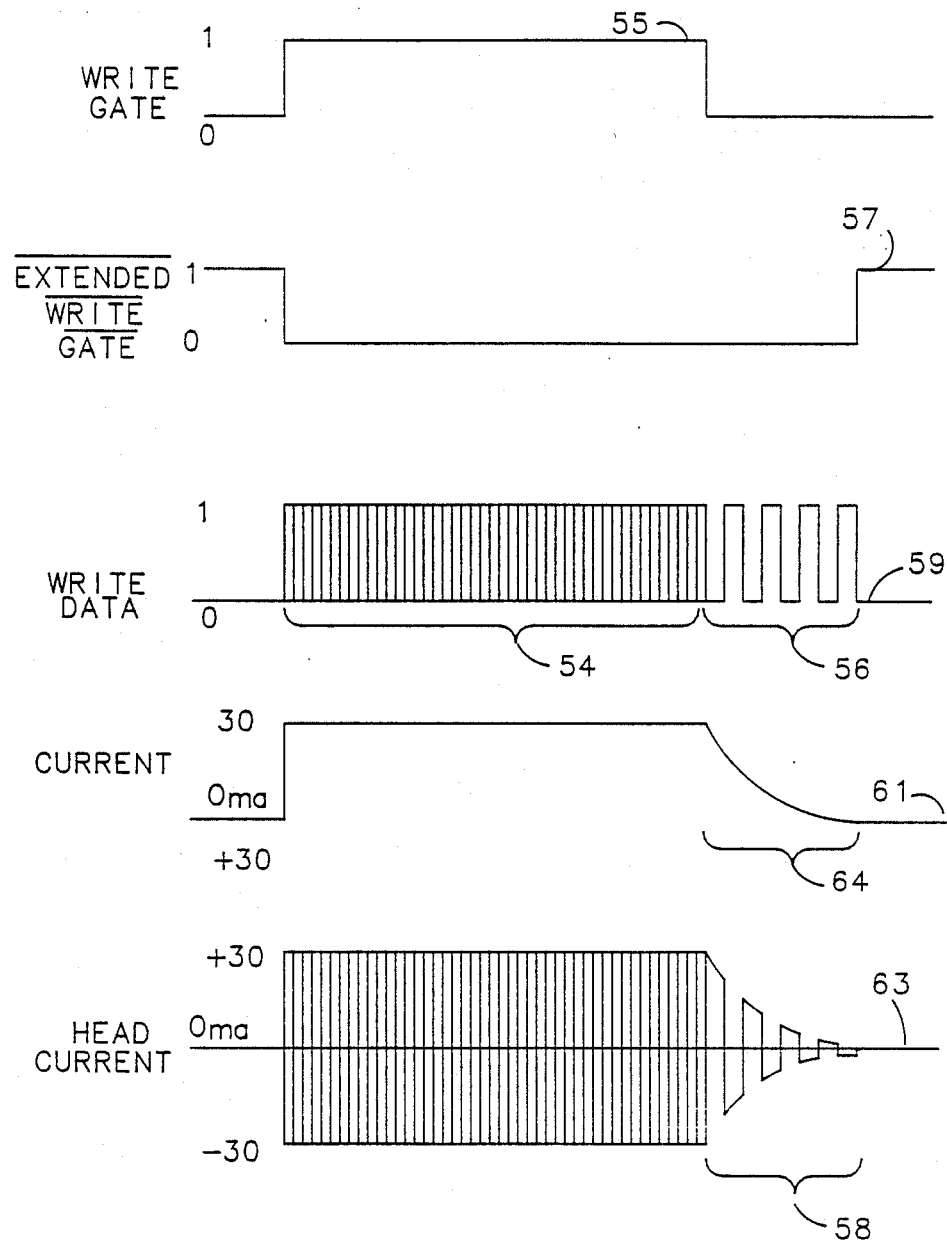
FIG. 7 is a diagram illustrating various waveforms utilized in the circuit shown in FIGS. 5 and 6.

Referring now to FIGS. 5, 6 and 7, FIG. 5 is a block diagram of an AC demagnetization circuit according to the principles of the present invention. Variable current source 31 provides a controlled current to the read/- write coil 39 via read/write circuit 37. A control signal having a waveform 61 is applied to the current source on control line 33 to provide a constant current level for a predetermined period of time followed by a decaying current level 54 for a second predetermined time. A data write signal 59 is applied to the read/write circuits 37 on line 35 which modulates the write current signal 61 to produce the read/write coil current signal 63. The first portion 54 of the data write signal 59 provides the actual data to be recorded on the magnetic recording media. The second portion 56 of the data write signal 59 provides the AC demagnetization pulses. The demagnetization pulses 56 are modulated by the decaying portion 64 of the write current signal 61 to provide the alternating demagnetization pulses 58 to the read/write coil 39 to drive the state of the magnetic transducer to a zero point at the conclusion of the write process. FIG. 6 is a functional block diagram of the preferred embodiment according to the principles of the present invention. The transducer drive printed circuit assembly 43 includes the necessary circuitry to produce the data write signal 59, the extended-write-gate signal 57 and the write gate 55. The transducer drive circuits are conventional circuits and will not be further discussed here. The read/write integrated circuit (IC) 41 comprises the necessary read/write circuits to read and record data (an IC manufactured by Silicon Systems, Inc. and designated SSI521R is suitable for this purpose). The read/write IC 41 also includes a current source to provide the write current for the read/write coil 49. The write current circuit includes write current programming resistor 51 and transistor 48. The write gate 55 is applied to the base of transistor 48 on line 53. When the write gate signal 55 is high, transistor 48 is turned on thereby allowing current to flow from ground through transistor 48 and resistor 51. When the write gate 55 goes low, transistor 48 is turned off and capacitor 52 charges through resistor 51 to provide the decay portion 64 of the write current signal 61. The data write signal on line 45 includes both the data 54 and the demagnetization pulses 56. In the preferred embodiment, the demagnetization pulses 56 are generated by the system data encoder circuits (not shown), but may be generated by any one of several well-known techniques, providing a pulsed signal from an external source, for example. The extended-write-gate signal 57 allows current to be supplied to the read/write coil 49 for the duration of the data write signal 59. The data write signal 59 is modulated by the write current signal 61 to produce the read/write coil current shown in waveform 63. At the completion of the data portion 54 of the write signal 59 the demagnetization pulses 56 are applied to produce the AC demagnetization signal 58 to the read/write coil 49. This signal 58 controllably drives the transducer to a zero, stable magnetic state prior to the commencement of the data read process.

In the preferred embodiment, the read/write function is implemented in a single coil 49 which is time shared to allow the read and write processes. The coil is located in or closely adjacent to a magnetic gap formed by the transducer yoke or yokes. Other read/write element implementations may be used with the present invention, such as separate read and write coils or a write coil and magnetoresistive read element, both influenced by the same magnetic circuit.

While the invention has been particularly shown and described with reference to a preferred embodiment thereof it will be understood by those skilled in the art that the forgoing and other changes in form and details may be made therein without departing from the spirit and scope of the invention. For example, the described AC current demagnetization of a magnetic transducer is not limited to thin film transducers but is applicable to any type of magnetic transducer which must be placed in a stable magnetization state prior to use such, as in the case of reading small magnetic fields.

We claim:

1. In a magnetic recording and reading apparatus including a magnetic transducer having a magnetic yoke element forming a magnetic circuit and at least one read element and at least one write element, a method for controlling the random occurrence of spurious pulses induced in the read element of a magnetic transducer when the magnetic field in said transducer elements decays from a metastable, non-zero remanent state to a stable remanent state resulting in a net change of magnetic flux through the transducer read element, said method comprising the step of applying an alternating current having a first value through said transducer write coil while decreasing said alternating current to a second value less than said first value.

2. The method of claim 1 including the step of monotonically decreasing said alternating current from said first value substantially equal to a value of write current applied to said write element during a data write process to said second value.

3. The method of claim 1 including the step of applying said alternating current to said write element at the completion of a data write process, said alternating current applied for a predetermined period of time prior to the commencement of a data read process.

4. The method of claim 2 wherein said second value is substantially zero.

5. The method of claim 1 wherein said read element and said write element comprise a single time-shared read/write coil.

6. The method of claim 1 including the steps of:
   generating a data write signal, said data write signal including a plurality of demagnetization pulses at the trailing end thereof;
   generating a write current signal; and
   modulating said data write signal with said write current signal to provide said decreasing alternating current.

7. In a magnetic data recording and reading device including at least one magnetic transducer having a magnetic yoke element forming a magnetic circuit and a read element and a write element, both said read and write elements influenced by said magnetic circuit, apparatus for generating an alternating current demagnetizing signal comprising:
   a controllable current source responsive to a write current control signal for providing a write current signal having predetermined characteristics; and
   circuit means coupled to said current source and to said write element, said circuit means responsive to said write current signal to modulate a data write signal and provide a modulated write current to said write element, said modulated write current including a data signal portion followed by a decreasing alternating current portion, said decreasing alternating current signal causing said magnetic transducer to have a stable magnetic remanent state prior to the commencement of a data read process.

8. The apparatus as in claim 7 wherein said read element and said write element comprise a single time-shared read/write coil.

* * * * *